United States Patent [19]

Lovendahl

[11] 4,164,381
[45] Aug. 14, 1979

[54] FACING AND GROOVING TOOL

[76] Inventor: Norman H. Lovendahl, 814 Clinton, River Forest, Ill. 60305

[21] Appl. No.: 824,726

[22] Filed: Aug. 15, 1977

[51] Int. Cl.² ............................................. B27C 9/00
[52] U.S. Cl. .................................. 408/20; 82/1.2; 82/34 A; 408/181
[58] Field of Search .................. 408/20, 21, 26, 181; 82/2 E, 1.2, 4 C, 34 A

[56] References Cited

U.S. PATENT DOCUMENTS

| 450,398 | 4/1891 | Corliss | 82/2 E |
|---|---|---|---|
| 547,664 | 10/1895 | Crudginton | 82/2 E |
| 876,999 | 1/1908 | Reiss | 408/26 |
| 1,121,068 | 12/1914 | Chard | 82/34 A |
| 2,247,284 | 6/1941 | Young | 82/1.2 |
| 2,358,741 | 9/1944 | Shelby | 408/181 |
| 2,630,027 | 3/1953 | Wunderlich | 82/1.2 |
| 2,821,874 | 2/1958 | Oliver | 82/1.2 |
| 3,067,637 | 12/1962 | Hopning | 408/181 X |
| 3,343,431 | 9/1967 | Boyer | 408/181 |

OTHER PUBLICATIONS

"Davis Star Feed Facing Heads"—Reference B submitted by applicant as prior art.

Primary Examiner—John Sipos

[57] ABSTRACT

A facing and grooving tool comprising a feed-out tool block installed in a tool slot of a boring bar and a feed-out actuator mounted on the bar around this tool block. A lever on the feed-out actuator is held in a stationary position while the bar rotates, thereby setting the actuating mechanism into operation and driving the cutting edge of a moveable tool section incrementally across a workpiece in a direction perpendicular to the axis of rotation of the bar, producing a flat surface. The actuator may be split for easy installation. Special tool block tips are used for grooving.

4 Claims, 12 Drawing Figures

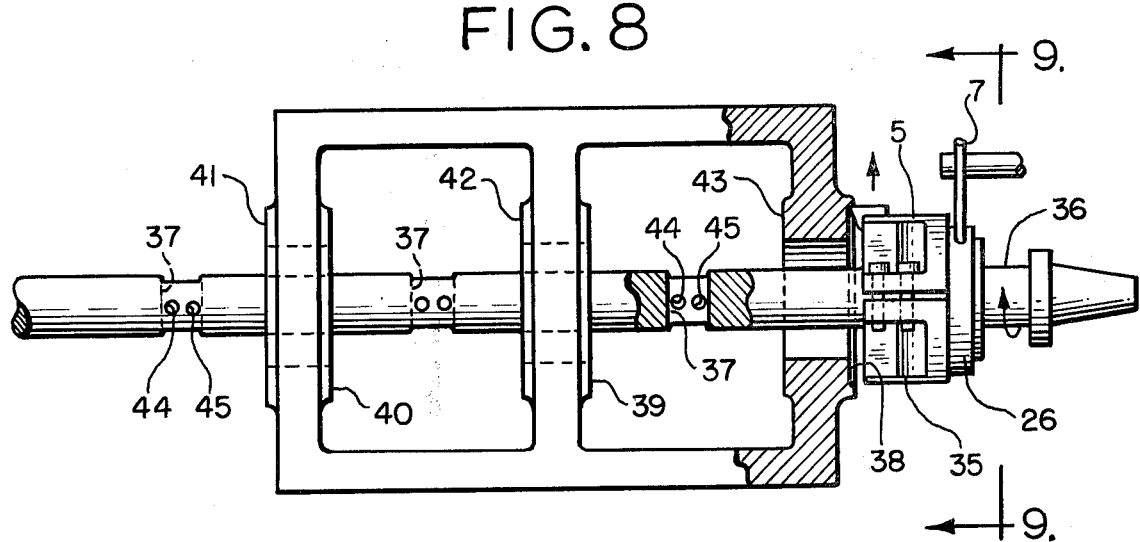
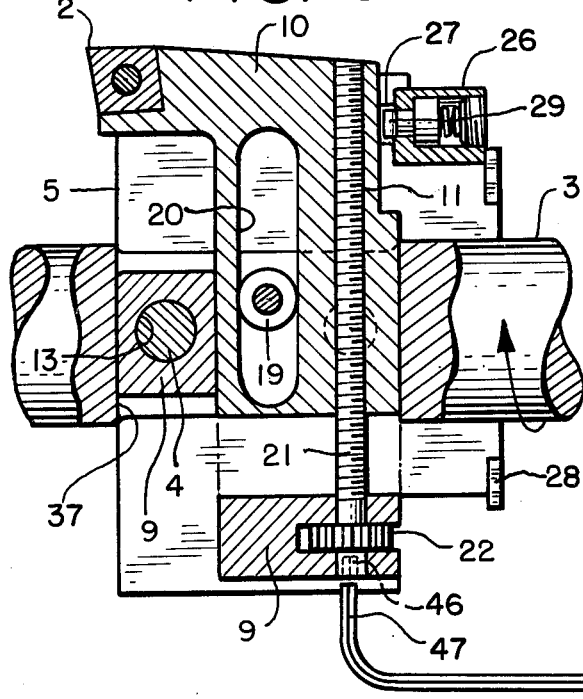
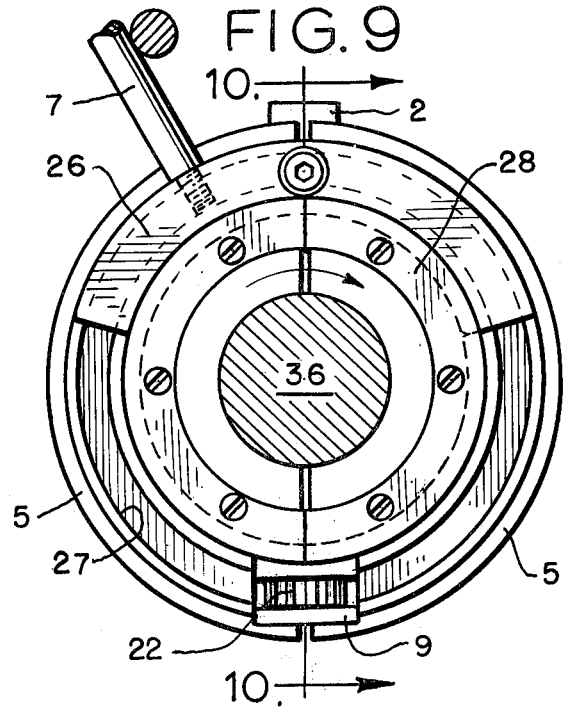
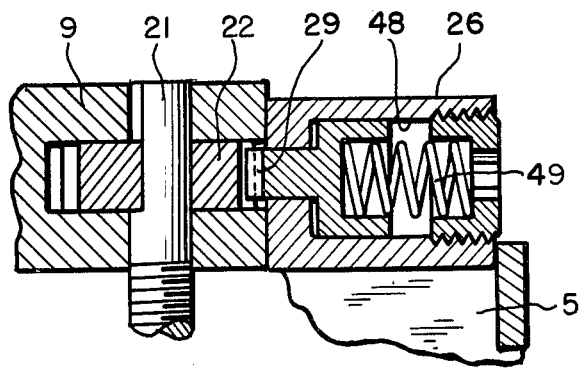
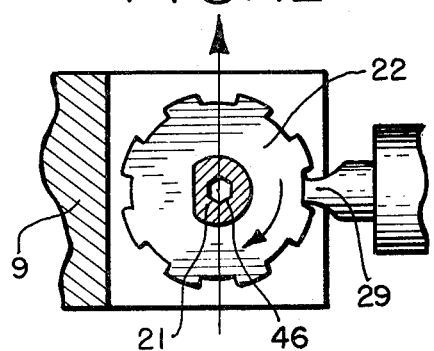

FACING AND GROOVING TOOL

This invention relates to facing and grooving tools. Facing is a machining operation which produces flat surfaces. In performing this operation, either the workpiece may be rotated, using a stationary tool; or a suitable tool may be rotated, keeping the workpiece stationary. The present invention is of the "rotary tool" type, i.e., it is designed to be used with boring, drilling, milling machines and the like having rotating spindles to which the tool is affixed by means of a boring bar. The following is therefore a brief description limited to rotary facing tools.

One type of tool which has been in use is the solid-block facing tool. This tool has wide, straight cutting edges perpendicular to the axis of rotation of the tool. The tool is mounted in a tool slot in a boring bar, and the boring bar connected to the spindle of a boring machine. The rotating tool is fed into the work to obtain a flat machined surface, the direction of feed being along the centerline of rotation of the boring bar (longitudinal feed). Use of this type of tool, however, requires a great deal of skill on the part of the machine operator to assure a good finished surface, "chattering" being a problem because of the width of the cutting edges and the force required to plunge the tool into the work. It is, of course, much to be desired that one not be dependent on the degree of skill of a machinist. The solid block facing tool is also not adjustable.

To circumvent the machining problems, it is desirable that the cutting forces be reduced by feeding the cutting edge of the tool used slowly across the workpiece in a direction perpendicular to the axis of rotation. This results in a flat machined surface which is also perpendicular to the axis of rotation of the tool.

A number of facing tools have been devised that include mechanisms for feeding the cutting edge of the tool gradually across a workpiece—commonly a few thousands of an inch per revolution, either continuously or incrementally. These prior art devices, however, have limitations not shared by the present invention, as will be seen.

Surfaces to be faced typically are areas which lie between two concentric circles. Facing is often associated with boring operations. After boring a hole for a rotating shaft, for example, one might want to machine a flat thrust bearing surface around the hole and at right angles to it to prevent end play of the shaft. The area to be machined would then extend perpendicularly from the inside diameter of the hole (inner concentric circle) laterally outward as far as required (to an outer concentric circular boundary). This is typical of numerous applications requiring flat machined surfaces around bored holes.

Indeed, since a facing operation is so often performed after a boring operation, the merit of a tool which facilitates changing from the one operation to the other with minimal equipment expense and set-up time will be readily appreciated. It is an object of the present invention to provide such a tool.

Boring is a machining operation wherein a roughly dimensioned hole in a workpiece is enlarged to precise tolerances. A boring operation, in which equipment of the type we are concerned with here is utilized, is conducted with a boring bar having one or more tool slots passing through the bar into which are installed boring blocks with cutting tips extending outside the radius of the boring bar. The boring bar is connected to the spindle of a boring machine or the like. The bar is rotated and fed longitudinally into the work.

Boring bars are expensive, particularly those used in making large holes, for which bars several inches in diameter and several feet long may be required. Bars for facing tools are correspondingly expensive, and therefore facing tools which require mounting on special facing bars, or on boring bars with special keyways or the like for a facing tool, incur additional expense and additional set-up time for detaching the boring bar from the machine spindle and attaching the facing bar. The present invention mounts on a standard boring bar, saving time and expense.

The solid-block type facing tool previously described also mounts on a boring bar; but the drawbacks of this tool have already been enumerated, "chattering" especially being a problem.

Chattering can be eliminated with feed-out type facing tools, but the ones presently available suffer from other limitations.

The primary advantage of the present invention over prior art devices is that it utilizes an interchangeable feed-out tool block that is installed in the tool slot of a boring bar. After boring, the boring block can simply be removed from the boring bar and the feed-out tool block installed in its place for facing. This feature eliminates the expense of purchasing an entire facing head for each range of facing operations and also eliminates the necessity of a special facing bar. A further advantage is that the cutting tip of the tool can be retracted into the tool slot for facing down to the diameter of the boring bar.

Some prior art facing tools have to be mounted on the machine tool near the spindle. This necessitates bringing the workpiece to the tool. Only certain types of simple jobs can be performed with this equipment. The present invention mounts in any position on a boring bar where a tool slot is available.

Some facing tools require an external fixture mounted to the machine tool or elsewhere to actuate the feed-out mechanism. The feed-out mechanism of the present invention is integral with the tool, resulting in greater versatility with respect to positioning the tool.

A further aspect of the invention is that special tips may be attached to the feed-out block for cutting grooves.

The invention will now be described more fully by way of example with reference to the accompanying drawings, wherein:

FIG. 8 is a side view of the invention, showing also a workpiece of a type for which the invention may be used to advantage.

FIG. 9 is an end view of the invention, taken from line 9—9 of FIG. 8.

FIG. 10 is a cross sectional view of the invention, taken along line 10—10 of FIG. 9.

FIG. 11 is an enlarged cross sectional view of the actuating rider and drive gear shown in FIG. 10.

FIG. 12 shows the actuating member of FIG. 11 engaging the drive gear.

Figure 1:
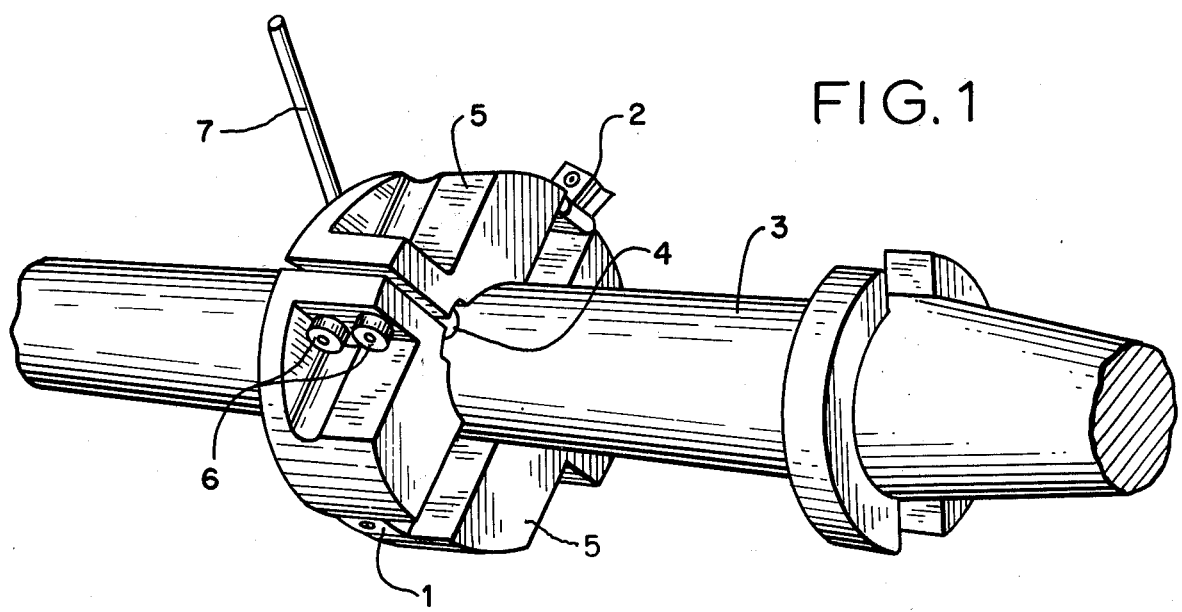
FIG. 1 is a perspective view of the invention, viewed from the workpiece side.

Referring to FIG. 1, a feed-out tool block 1 having a cutting tip 2 (usually tungsten carbide) passes through a tool slot in boring bar 3 and is held in place by suitable means, such as a threaded taper pin 4 passing through the boring bar and the tool block. Tool block 1 is compatible with the tool slot; that is, it fits in the slot and is meant to be interchangeable with a boring block. For the purposes of this application, we define "boring bar" as a rotatable bar having a tool slot suitable for the feed-out tool block of the present invention. Feed-out actuator housing 5 is mounted on the bar around the tool block. The actuator housing may be split for easy installation and held in place by suitable means, such as screws 6 engaging opposite halves of the housing and pulling the halves tightly against the bar. Lever 7 is held or braced in a stationary position by the machinist while boring bar 3 rotates, which results in cutting tip 2 being gradually fed across a workpiece at right angles to the axis of rotation of bar 3.

Figure 2:
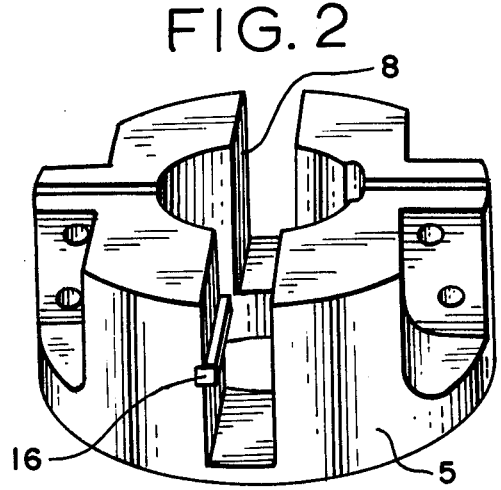
FIG. 2 shows the actuator housing removed from the bar.

FIG. 2 shows the actuator housing 5 removed from the bar. SLot 8 fits around the feed-out tool block.

Figure 3:
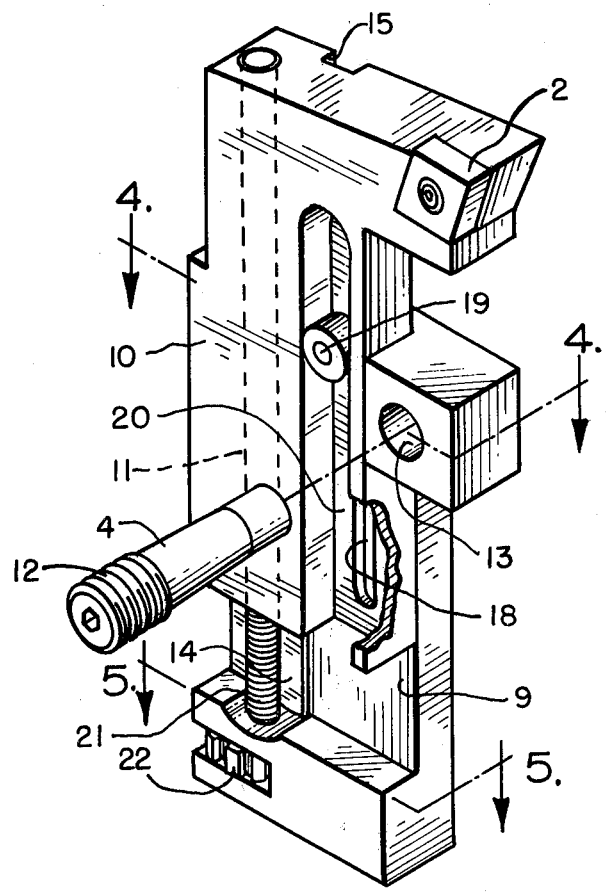
FIG. 3 is a perspective view of the feed-out tool block.
Figure 4:
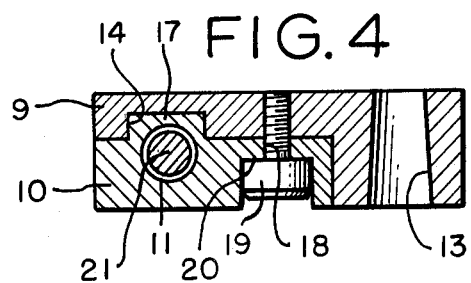
FIG. 4 is a cross sectional view of the tool block taken along line 4—4 of FIG. 3.
Figure 5:
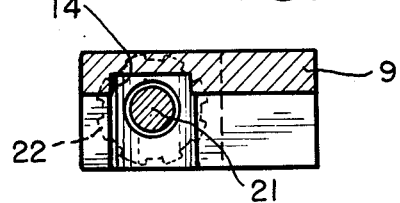
FIG. 5 is a cross sectional view of the tool block taken along line 5—5 of FIG. 3.

Referring to FIGS. 3, 4, and 5, the feed-out block includes a fixed section 9, and moveable tool section 10. The moveable section is slideably mounted on the fixed section. The moveable section has a threaded drive hole 11 at right angles to the axis of rotation of the boring bar. Fixed section 9 is fastened securely in the tool slot of a boring bar by threaded taper pin 4, this pin having a threaded section 12 engaging a partially threaded taper pin receiving hole in the boring bar, the remainder of the pin passing through the bar and through hole 13 in the fixed section.

Guide means are provided to restrict the moveable tool section to radial feed motion; that is, motion which results in the cutting tip being fed across a surface to be faced in a plane perpendicular to the axis of rotation of the boring bar. The tool block has a guide channel 14 engaged by guide projection 17 (FIG. 4), and a keyway 15 (FIG. 3) engaged by key 16 (FIG. 2).

Means may be provided to limit the travel of the moveable tool section. Moveable section 10 has an elongated slot 18 perpendicular to the axis of rotation of the boring bar. Stop screw 19 engages the slot and is threadably fastened to the fixed section, thus preventing the moveable section from falling off the tool.

Screw 19 may also be used to adjust the amount of friction between the moveable tool section and the fixed section. Moveable section 10 has a projecting rim 20 extending into the elongated slot 18 under the head of screw 19, so that tightening of screw 19 results in the moveable section being pressed more firmly against the fixed section.

Drive screw 21 is rotatably connected to the fixed section and engages drive hole 11. The moveable section 10, which carries on it cutting tip 2, moves relative to the fixed section in response to turning of the drive screw.

Figures 6, 7:
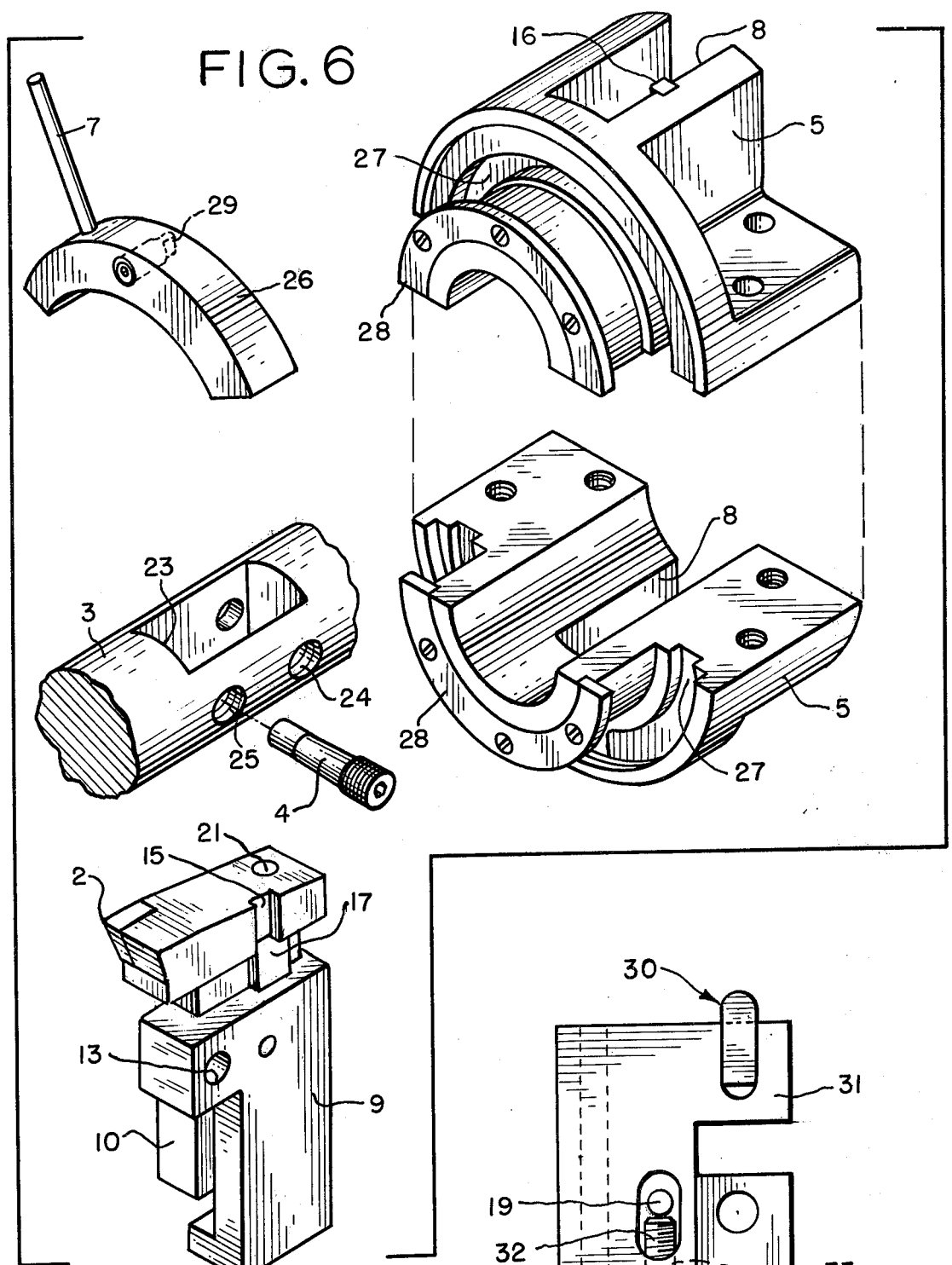
FIG. 6 is an exploded perspective view of the invention.
FIG. 7 is a side view of the tool block modified for grooving.

Referring to FIG. 6, the tool is shown disassembled. In assembling the tool, tool block 1 would first be put through tool slot 23 in boring bar 3. Hole 13 in the fixed section 9 of the tool block would be lined up with either of the two taper pin receiving holes 24 and 25 provided in the boring bar. The threaded taper pin 4 would be passed through hole 25 (or 24) and through hole 13 and screwed into the boring bar to hold the tool block in place. The two halves of the actuator housing would then be clamped on to the boring bar around the tool block in the manner indicated in FIG. 1, with the tool block fitting into slot 8 and with key 16 engaging keyway 15.

Lever 7 is attached to an actuating rider 26, which is part of the feed-out actuating mechanism. Actuator housing 5 has a circumferentially-disposed guideway 27 that retains rider 26, but permits free travel of the rider around the guideway when the tool is assembled. Retaining plates 28 form part of the guideway, the remainder of the guideway being cut into the actuator housing.

Rider 26 carries on it an actuating member 29. This member engages drive gear 22 (FIG. 3) for feeding out the moveable section of the tool block, as is shown more clearly in later figures.

FIG. 7 shows the tool block of the present invention set up for cutting grooves. Grooving tip 30 mounts on a moveable tool section 31 adapted for such a tip. The grooving tool operates in the same manner as the facing tool.

Moveable tool section 31 has a threaded travel-adjusting hole 33 in line with stop screw 19 as the moveable section feeds out. Adjustable stop screw 32 screws into hole 33 and terminates the feed of the moveable section when it hits stop screw 19. Hole 34 provides easy access to the adjustable stop screw. Similar travel-adjusting means may be used for facing.

Referring to FIG. 8, facing tool 35 is mounted on a boring bar 36 having several tool slots 37. The bar is depicted partially cut away to show the tool slots. A typical workpiece of a fairly complex nature requiring facing operations on surfaces 38, 39, and 40 and backfacing on surfaces 41, 42, and 43 is shown. The ease with which the present invention may be mounted on a boring bar, which may already be set up subsequent to a boring operation, then dismounted and placed in any position on the bar where there is a slot, or reversed for backfacing, will be readily apparent. Note that the two taper pin receiving holes 44 and 45 provided in the boring bar on either side of the tool slot for reversing a boring block can also be put to good use to reverse the facing tool block for backfacing. The self-contained feed-out mechanism enhances the versatility of the invention, as compared to units that must be mounted to the machine tool or that require external fixtures to activate the feed-out mechansim.

The remaining FIGS. 9–12 show how drive gear 22 is set into motion. Referring to FIGS. 9 and 10, it will be seen that drive gear 22 is accessible from guideway 27. Rider 26, carrying on it actuating member 29, is held in place by means of lever 7 while the boring bar and the rest of the tool rotate. Each time the bar makes a revolution, member 29 hits a tooth of gear 22 and causes the gear to rotate, thereby rotating the drive screw 21 and causing the cutting edge 2 of the tool to be fed incrementally across a workpiece. FIGS. 11 and 12 show the gear 22 engaged by member 29. The gear teeth are spaced so that the actuating member smoothly meshes with the gear on each revolution. The gear has no particular tendency to rotate when not engaged by the member due to the friction between the fixed and moveable sections generated by screw 19.

Actuating member 26, when held in a stationary position, may be thought of as generating power impulses by reaction when it comes into contact with a tooth of drive gear 22. Engagement with the gear results in a transfer of this power to the gear. Gear 22 and drive screw 21 transmit this power to the moveable tool section 10 for feed out.

It is to be understood that a variety of mechanisms besides that shown are utilizable for feeding out the moveable section of the tool block, either incrementally or continuously, and that the inventive concept of the present invention resides primarily in the combination of the feed-out tool block with any type of actuator. Although the description of the invention has been limited to a facing tool combining a feed-out tool block with an actuator having an integral feed-out mechanism actuated by a lever connected to the tool, this does not mean that the feed-out block cannot be combined with other types of actuating mechanisms.

Referring to FIGS. 10 and 12, an adjusting tool socket 46 in the end of the drive screw permits turning of the drive screw by an Allen wrench 47 of the like for initial positioning of the cutting tip.

Means may be provided to disengage the feed-out actuating mechanism from the moveable tool section 10 (FIG. 3) to prevent overfeeding of the tool when its travel has reached the position limited by stop screw 19. Referring to FIG. 11, the actuating member 29 is spring-loaded in rider 26. Rider 26 has a recess 48 in which actuating member 29 is slideably mounted. Spring 49 supports member 29. When gear 22 is no longer free to rotate because the moveable tool section has reached the end of its travel, member 29 is pushed into recess 48, thus preventing breakage of the feedout components.

We claim:

1. A facing and grooving tool for use with a rotatable general purpose boring bar having at least one tool slot capable of receiving interchangeable tool blocks comprising:

a feed-out tool block compatible with the tool slot of the boring bar, the tool block including a fixed section securely fastenable in the tool slot of the boring bar by suitable means and a moveable tool section having a cutting tip, the moveable section being slideably mounted on the fixed section;

guide means restricting the moveable tool section to radial feed motion;

a feed-out actuator housing mountable on the boring bar, the housing having a circumferentially-disposed guideway;

an actuating rider retained by the circumferentially-disposed guideway;

an actuating member mounted on the rider;

a lever attached to the rider for holding it stationary while the bar and the rest of the tool rotate;

a drive screw threadably engaging the moveable tool section for feed-out, the drive screw being rotatably connected to the fixed section; and a drive gear attached to the end of the drive screw and extending into the circumferentially disposed guideway, the gear being engaged by the actuating member and being turned by it when the actuating rider is held stationary, whereby the moveable section is fed out.

2. The tool of claim 1, wherein the actuator housing is split for easy installation over the side of the boring bar.

3. The tool of claim 1, wherein the tool further comprises means for limiting the travel of the moveable tool section, and wherein the actuating member is spring-loaded, allowing the member to be pushed into the rider when the drive gear no longer rotates because of the moveable section reaching the end of its travel.

4. The tool of claim 1, wherein the drive screw has an adjusting tool socket in its end permitting initial positioning of the cutting tip.

* * * * *